June 9, 1931.                    A. W. CAPS                    1,808,836

PHOTOGRAPHIC APPARATUS

Filed March 1, 1929          7 Sheets-Sheet 1

INVENTOR
Arthur W. Caps
BY
his ATTORNEYS

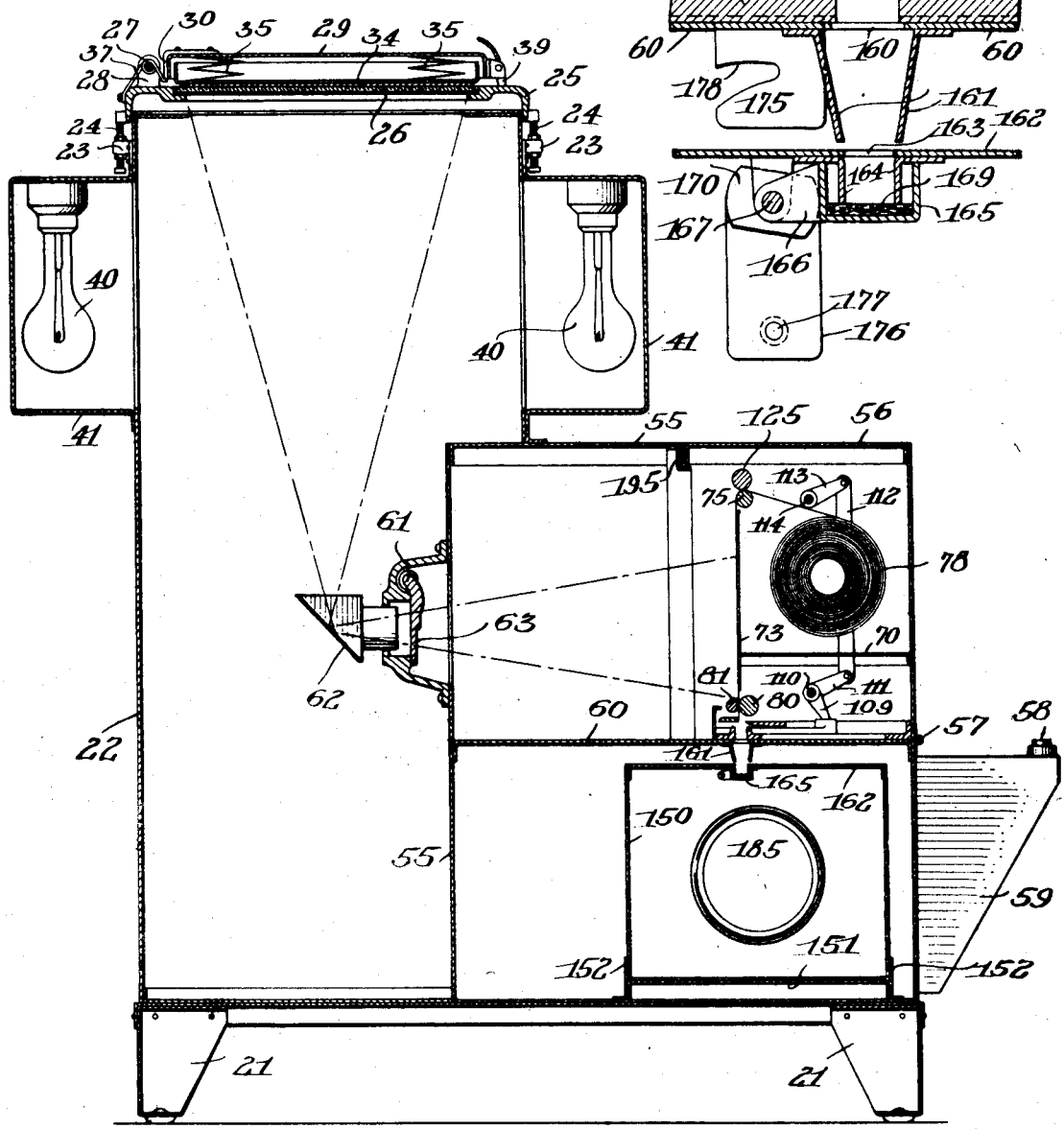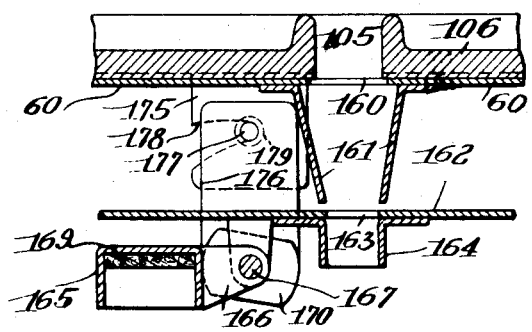

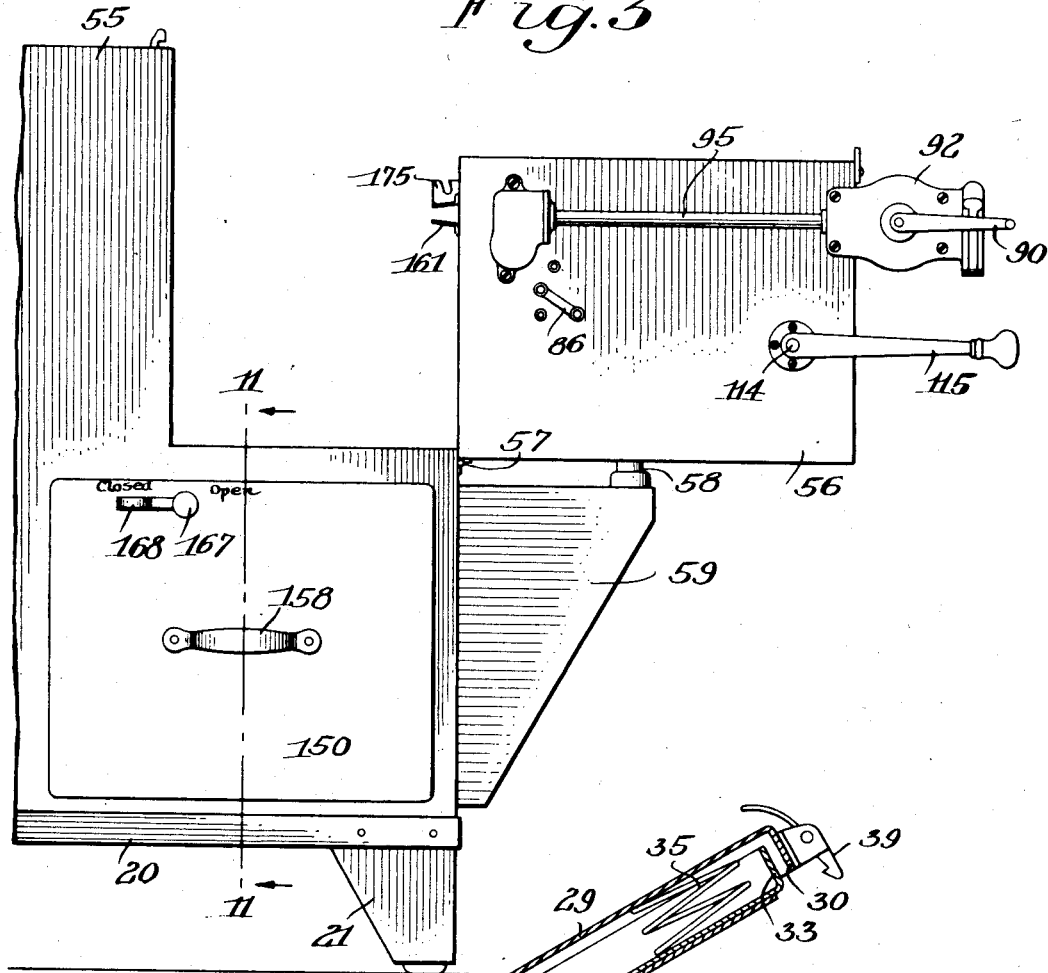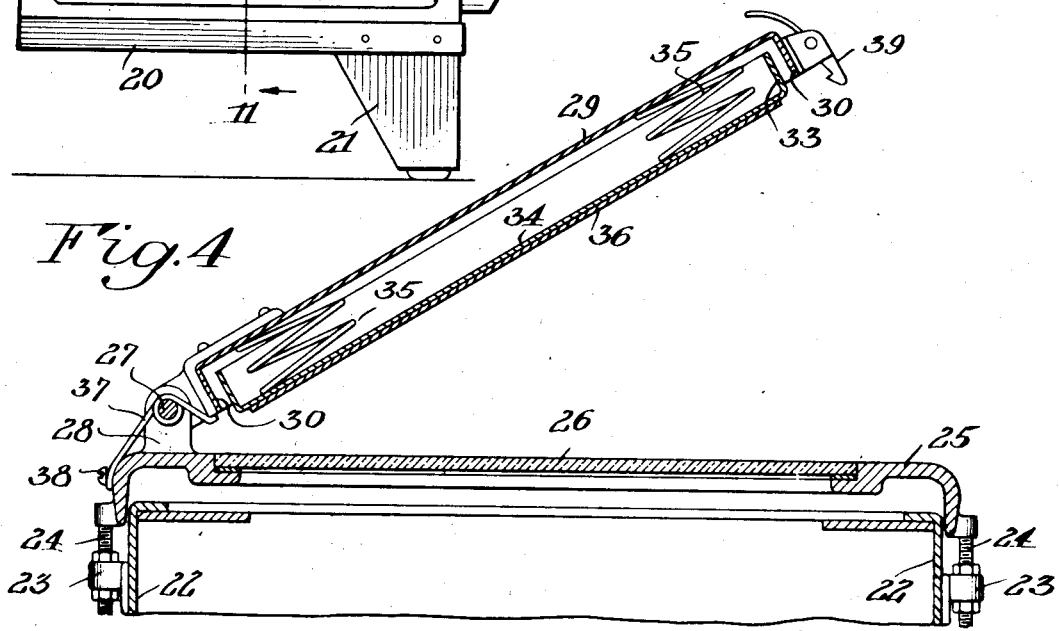

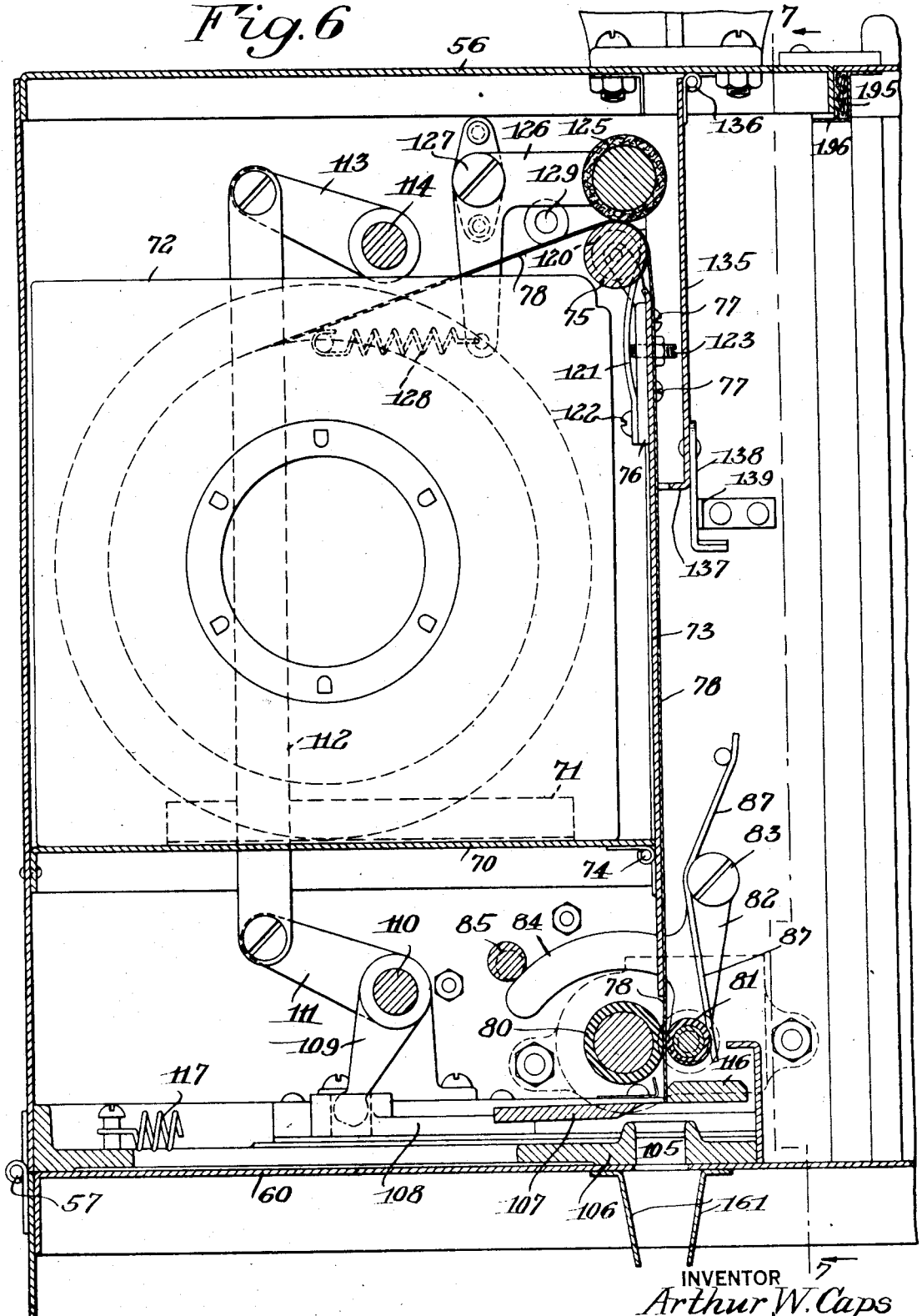

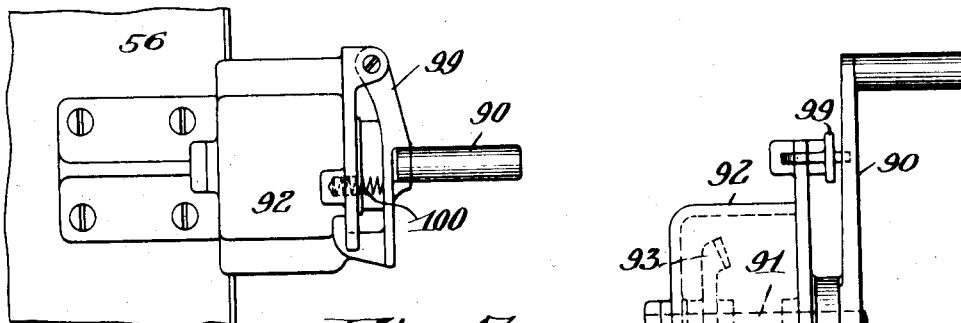
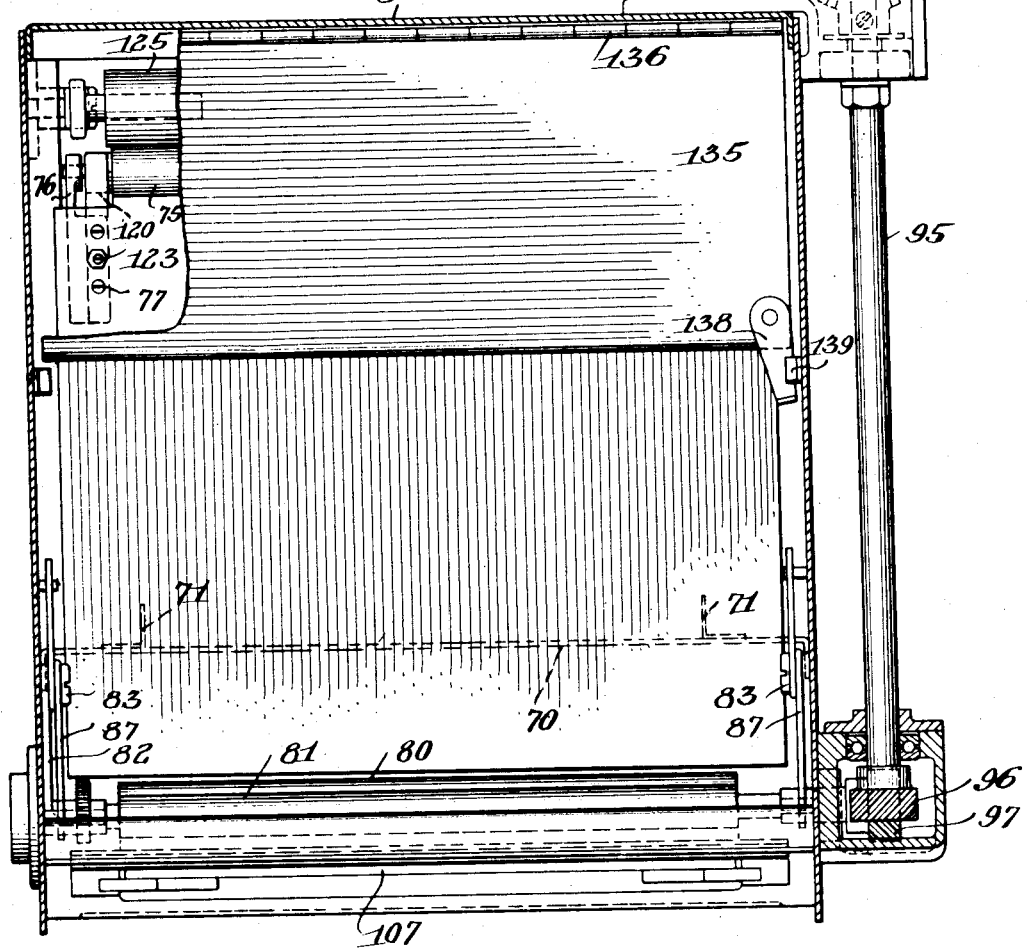

Patented June 9, 1931

1,808,836

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed March 1, 1929. Serial No. 343,653.

This invention relates to photographic apparatus such as a camera used, for example, in making photographic copies of documents, address labels on packages, or similar uses. The principal object of the invention is to provide light and compact apparatus capable of efficient and satisfactory use for purposes such as those above mentioned.

Another object of the invention is to provide a camera in combination with a copyholder arranged above the camera so that the camera will photograph the under side of objects placed on the copyholder. Such an arrangement permits the taking of photographs of address labels on packages, for example, in an easy and rapid manner.

Still another object is the provision of simple and satisfactory closure means for a receptacle for holding sensitized sheet material, and the provision of means for insuring the closing of this closure means before parts of the apparatus are shifted in such a way that light could enter the receptacle through the opening controlled by the closure means.

A further object of the invention is the provision of means controlled by movement of a copyholder for illuminating objects placed on the copyholder to be photographed, movement of the copyholders to effective position turning on the lights, for example, and movement to another position turning off the lights, thus saving the cost of useless illumination during the interval between exposures.

Still further objects reside in the provision of means for varying the tension on a strip of sensitized sheet material so that the material may be tensioned to the proper amount to cause it to lie smoothly in the focal plane of the camera; in the provision of means for permanently masking a portion of the sheet material in the focal plane so that exposure may only be made on another portion which lies smoothly and undistorted; and in the provision of a pivoted focal plane support and of various other improved details of the apparatus.

To these and other ends the invention resides in certain improvements and combinations of parts, all as will be hereinafter more fully described, the novel features being pointed out in the claims at the end of the specification.

In the drawings:

Fig. 2 is a vertical section taken centrally through the apparatus shown in Fig. 1;

Fig. 3 is a fragmentary side elevation of the rear portion of the apparatus shown in Figs. 1 and 2, illustrating the magazine portion of the camera body in its open position;

Fig. 4 is a longitudinal vertical section taken centrally through the copyholder, illustrating details thereof;

Fig. 6 is a longitudinal vertical section taken centrally through the magazine portion of the camera, illustrating details thereof;

Fig. 7 is a transverse vertical section taken substantially on the line 7—7 of Fig. 6;

Fig. 8 is a plan of the operating handle for the sheet feeding devices, which handle is shown in elevation in Fig. 7;

Fig. 13 is a fragmentary vertical section through the closure and associated parts, showing the closure in open position and illustrating also the interlock, and Fig. 14 is a view similar to Fig. 13 showing the closure in its closed position.

Similar reference numerals throughout the several views indicate the same parts.

Figure 1:
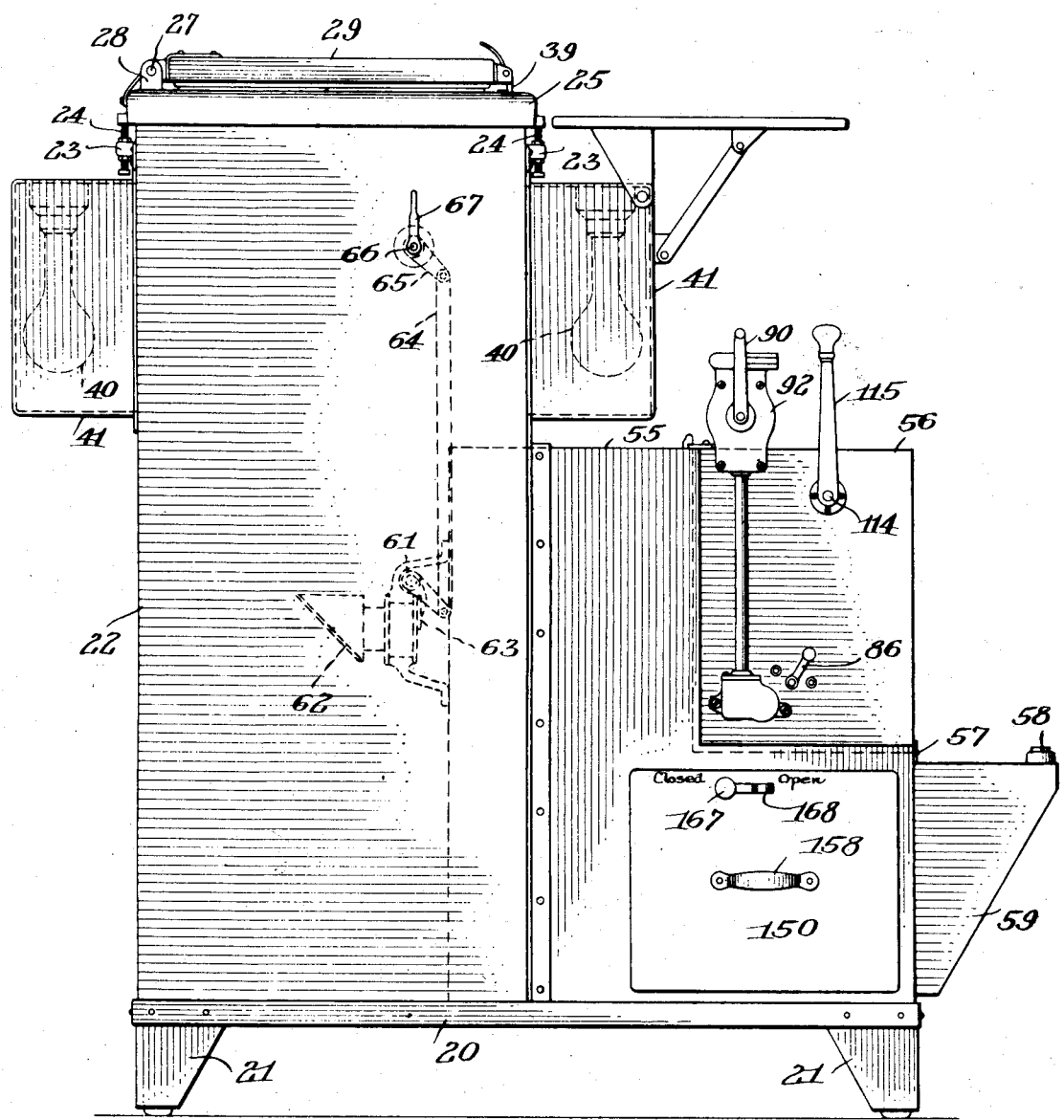
Fig. 1 is a side elevation of an apparatus constructed in accordance with a preferred embodiment of the invention, illustrating it in normal operative position, ready to make an exposure.

As a preferred embodiment of the invention there is illustrated in the drawings an apparatus having a base 20 resting upon legs 21. Rising from the forward part of this base is a substantially vertical casing 22 carrying near its upper end brackets 23 having long screws 24 threaded therethrough. These screws serve as an adjustable support for a copyholder which may comprise, for example, a frame plate 25 having a large central opening in which a plate of transparent material 26 such as glass, is set. The transparent plate 26 preferably has a top surface flush with the top of the supporting plate or frame 25, as is illustrated clearly in Figs. 2 and 4.

Figure 5:
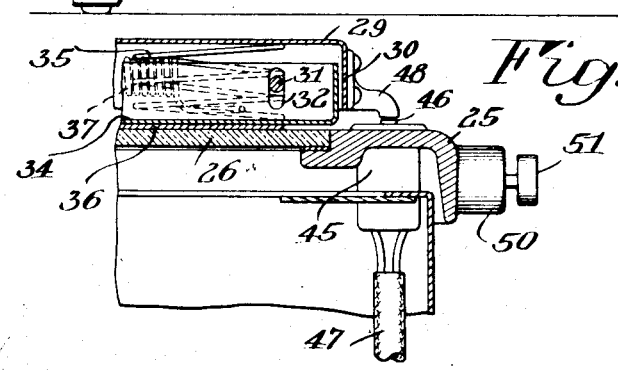
Fig. 5 is a transverse vertical section through a portion of the copyholder, illustrating the switch for controlling the lights.

Pivotally mounted on a shaft 27 held in brackets 28 on the frame 25 is a follower member arranged to be brought down toward the top surface of the glass plate 26 so as to hold papers or documents smooth and flat on this glass. This follower member, as is shown in Figs. 4 and 5, comprises a plate 29 mounted on the shaft 27, the plate having downturned marginal flanges 30 to which are secured pins 31 projecting inwardly through elongated slots 32 in upstanding marginal flanges 33 of a follower plate 34 urged away from the plate 29 by resilient means such as the springs 35. The ends of the slots 32 engaging the pins 31 limit the extent of the motion produced by the springs 35. A soft pad 36, of felt or the like, may be placed on the under surface of the follower plate 35.

A spring 37 coiled around the shaft 27 has one end thereof in engagement with the follower member and the other end thereof secured by a screw 38 to the copyholder frame 25, so that this spring tends to elevate the follower member to some such position as that illustrated in Fig. 4. If it is necessary to throw the follower member still farther back, this may easily be done by hand. When a document has been placed on the transparent supporting surface 26, with the side of the document to be photographed downwardly, the follower member is then brought down by hand against the tension of the spring 37 so that the pad 36 rests upon the top of the document and holds it firmly and smoothly against the glass 26. The follower member is latched in this position by a spring latch 39. The springs 35 allow the follower plate 34 to move upward slightly relative to the plate 29, so that the copyholder may accommodate documents having considerable variation in thickness.

Suitable illuminating means is provided for illuminating the surface to be photographed. This illuminating means may comprise electric lamps 40 within casings 41 on the front and back walls of the copyholder casing 22, the lamps being so placed that the light therefrom shines upwardly through the glass plate 26 and illuminates the surface to be photographed which rests upon the top of this glass plate.

In order to save useless waste of the electric current during the time that documents are being positioned on the copyholder, while no exposure is being made, means controlled by movement of the follower member of the copyholder is provided for turning on and off the lamps 40. This means comprises a spring switch 45 as shown in Fig. 5, which switch is arranged to be closed when a spring plunger 46 is depressed, and arranged to open automatically when this spring plunger is allowed to rise. The switch 45 is connected in series in the lamp circuit, electrical leads 47 being shown in Fig. 5. A bracket 48 fixed to the marginal flange 30 of the follower member 29 is arranged to cooperate with the switch plunger 26, so that the switch will be closed automatically whenever the follower member is moved into cooperation with the supporting surface 26, and will be opened when the follower member is unlatched and allowed to rise by the action of the spring 37.

From this arrangement, it follows that when a document is placed on the transparent supporting surface 26 and the follower member is brought into cooperation therewith to hold the document smoothly on the supporting surface, the lights will be lit automatically so that an exposure may be made. When the exposure is completed and the follower member is raised so that the photographed document may be removed and another document may be substituted therefor, the lights will automatically go out, and will come on again when the follower member has been moved down into cooperation with the next document. Since a considerable time may elapse while documents are being gotten ready for exposure, it is apparent that a considerable amount of electrical current may be saved by the use of an automatic control for the lighting circuit, such as has been here disclosed.

It may frequently be desirable to photograph portions of bulky packages, books, or the like, which would be too thick to be placed beneath the follower member. In such instances, the follower member may be thrown back to an inoperative position in which it does not overlie the supporting surface 26, and the packages or books to be photographed may be placed on this supporting surface and may be held there simply by gravity or by the use of weights if necessary. Since the automatic switch 45 would not be operated under these circumstances, there is provided a manual switch 50 secured to the frame member 25 of the copy-holder as shown in Fig. 5. This switch is connected in parallel with the spring switch 45. When the operating knob 51 of the manual switch 50 is turned to the "on" position, the lights 40 will be lit notwithstanding the fact that the follower member of the copyholder is thrown back to a position in which it does not actuate the spring switch 45. In this way, means is provided for turning the lights 40 on and off as desired when it is necessary to photograph bulky objects which prevent the use of the copyholder follower and which consequently prevent the use of the automatic switch controlled by this follower.

Cooperating with the copy holder supporting casing 22 is a camera so placed that it may photograph objects resting upon the transparent supporting surface 26 of the copyholder. This camera comprises a body portion 55 projecting somewhat into the copyholder casing 22 as shown in Figs. 1 and 2, and a magazine portion 56 hinged at 57 to the body portion so that it may be thrown back from the normal or operating position illustrated in Figs. 1 and 2 to the position shown in Fig. 3, in which it rests upon a rubber block 58 on a bracket 59. A horizontal partition 60 divides the body portion 55 of the camera into an upper or exposure chamber and a lower chamber in which a print receiving receptacle is provided as will be described hereafter. The point at which the magazine section 56 is hinged is at or slightly above this horizontal partition 60, as indicated in Fig. 2.

A lens and shutter housing 61 projects forwardly from the front wall of the camera body portion 55, as is illustrated in Figs. 1 and 2. Suitable lens means is carried by this casing, the optical axis of the lens means being substantially horizontal. In order to permit the camera to photograph objects placed on the copyholder, a reflecting surface is provided in alinement with the optical axis of the lens means so that light passing downwardly from the copyholder is reflected to pass through the lens means. This reflecting surface may comprise, for instance, the prism 62. A pivoted shutter 63 within the housing 61 is arranged to be operated by a link 64 connected to an arm 65 on a shaft 66 having an operating handle 67 on the exterior of the copyholder casing 22, as shown in Fig. 1.

The lens means, carried by the housing 61, is so arranged that the focal plane thereof is within the magazine portion 56 of the camera. The construction of this magazine portion is best illustrated in Figs. 6 and 7. Referring now to these figures, a horizontal partition or shelf 70 is provided at a point somewhat above the bottom of the magazine portion, and angle irons 71 fixed to the top of this shelf serve as lateral guides for positioning a removable roll box 72 in which a roll of sensitized sheet material may be placed. A plate 73, hinged to the front edge of the shelf 70 at 74, forms a focal plane support for holding sheet material in the focal plane in position to be exposed. The focal plane support 73 is illustrated in Fig. 6 in its vertical or operative position, in which it lies in the focal plane. When it is desired to remove the roll box 72, however, to place a fresh supply of sheet material therein, the focal plane support 73 may then be turned about its pivotal axis 74 in a clockwise direction when viewed as in Fig. 6, so as to permit access to and removal of the roll box. This would be done, of course, when the magazine section 56 of the camera was thrown back to the position illustrated in Fig. 3, which would open up the front of the magazine portion and permit access to the focal plane support 73 and other parts in the interior of the magazine portion.

A guide roller 75, preferably of soft rubber, is journalled at its ends in brackets 76 secured to the sides of the plate 73 near the top thereof, by screws 77. The web 78 of sheet material from the roll thereof within the roll box 73 passes over this guide roller 75 in the manner shown in Fig. 6 and thence extends downwardly along the front surface of the focal plane support 73 to suitable sheet feeding devices, which may comprise rolls 80 and 81, the former being journalled in the walls of the magazine portion and the latter being journalled on levers 82 pivoted at 83 to the inner surfaces of the side walls of the magazine portion. The levers 82 have arms 84 engageable by eccentric portions 85 on a shaft extending transversely across the magazine portion and having an operating handle 86 (Figs. 1 and 3) on the exterior of the magazine portion. Movement of the operating handle 86 to the proper position turns the cams 85 to move the lever arms 84 in counter-clockwise direction when viewed as in Fig. 6, thus separating the roll 81 from the roll 80 to permit threading the web 78 of sheet material between these rolls. When the operating handle 86 is moved back to its normal position, a spring 87 moves the roll 81 into contact with the sheet material, pressing the latter tightly against the roll 80, so that rotation of this roll results in feeding the sheet material.

The roll 80 may be driven in any suitable manner, such as by the handle 90 illustrated in Figs. 7 and 8. This handle is fixed to a shaft 91 journalled in a casing 92 mounted on the magazine portion of the camera, which shaft carries a bevel gear 93 meshing with another bevel gear 94 on a vertical shaft 95 which has a spiral gear 96 at its lower ends. This spiral gear meshes with another spiral gear 97 fixed to the shaft on which the feed roll 80 is mounted.

A latch 99 urged by a spring 100 into a position in which the shoulder of the latch is in the path of movement of the handle 90, serves as the stop member for this handle, permitting only one revolution thereof at a time. A one-way clutch is associated with the feeding devices so that the handle 90 may be turned only in one direction, this being the direction for feeding the sheet material downwardly. The normal position of the operating handle is as illustrated in Figs. 7 and 8. When it is desired to feed the sheet material, the latch 99 is pressed inwardly against the tension of the spring 100, so that the shoulder of the latch is removed from the path of the handle 90. The handle may then be turned. After the movement of the handle has begun, the latch 99 springs out to its effective position under the influence of the spring 100, so that at the end of one complete revolution of the handle, it comes into contact with the shoulder of the latch and is stopped. The relationship between the various gears and the diameter of the drive roll 80 is such that one revolution of the handle 90 produces sufficient rotation of the roll 80 to feed the sheet material 78 the desired amount corresponding to slightly more than one dimension of the exposed portion of the material.

Figure 9:
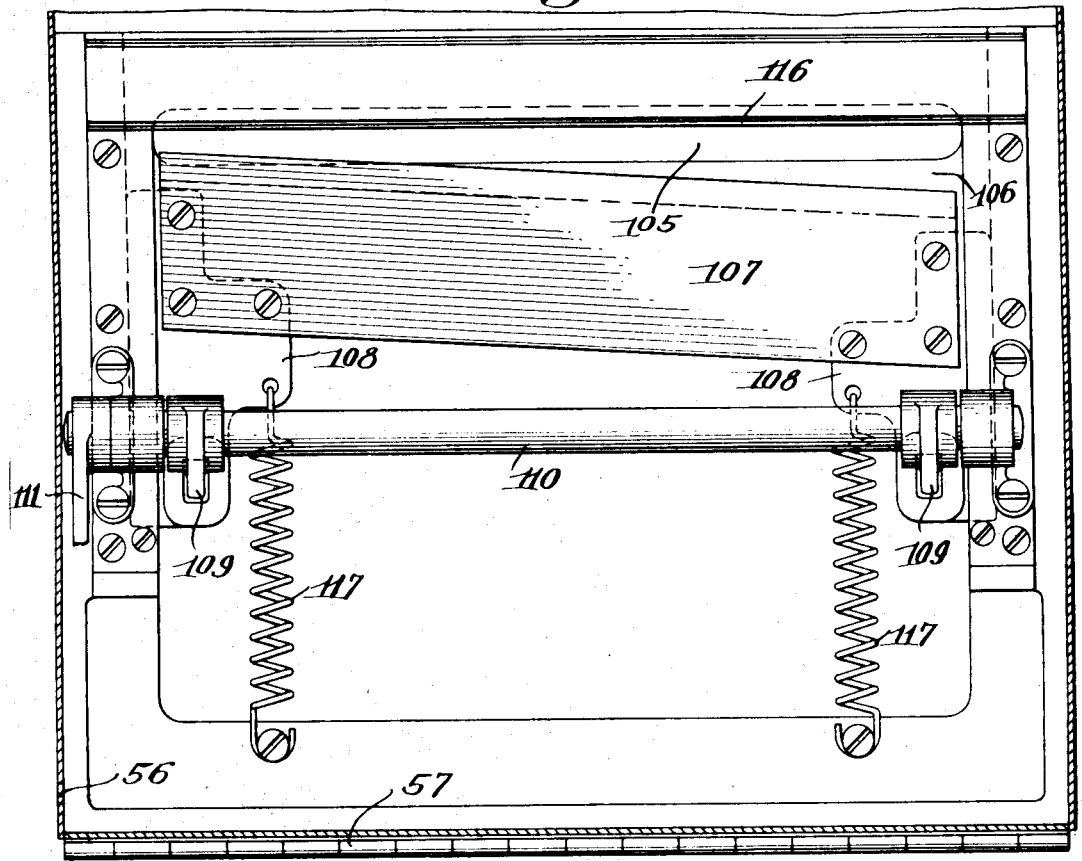
Fig. 9 is a plan of the sheet severing mechanism, portions of the casing being shown in section.

When the sheet material is fed downwardly by the feeding devices, it passes through a slot 105 in a frame plate 106 which constitutes the bottom of the magazine portion 56, and through a corresponding slot 160 in the partition 60 of the camera body, and down into a print receiving receptacle which will be described hereafter. The exposed portion thus fed downwardly is severed from the remainder of the sensitized sheet material by suitable sheet severing mechanism including the reciprocating knife blade 107 (Figs. 6, 9 and 10) having its ends secured to slide members 108 arranged to reciprocate in suitable horizontal guideways formed at the sides of the frame plate 106. These slide members 108 may be actuated by suitable means such as the arms 109 on a shaft 110, the shaft being oscillated by an arm 111 thereon actuated by a link 112 pivoted to an arm 113 on a shaft 114 which is provided with an operating handle 115 on the exterior of the magazine portion of the camera, as illustrated in Figs. 1 and 3. Actuation of this handle 115 moves the knife blade 107 forwardly into cooperation with a bar 116, so that the sheet material is severed and drops down into the print receiving receptacle. Springs 117 return the knife blade to its normal position.

It has been mentioned above that the latch 99 stops the feeding handle 90 at the end of each complete revolution thereof. If the handle be moved with considerable speed, the roll of sensitized sheet material may obtain a considerable momentum during the feeding operation and consequently the inertia thereof may cause the roll to overrun when the feeding handle is brought to a sudden stop. This might cause looseness of the sheet material resulting in displacement or bulging of the portion thereof intended to lie in the focal plane, which happens when the sheet material is not sufficiently taut. In order to prevent such bulging or displacement, and to confine the looseness of the sheet material to the portion thereof which is not in the focal plane, means is provided for retarding the rotation of the guide roller 75, and for holding the sheet material in contact with this guide roller so that the retarding effect of the roller may be effective upon the sheet material.

As is best illustrated in Figs. 6 and 7, the roller 75 has a cylindrical portion 120 of metal at each end of the central rubber portion thereof. A spring 121 secured by a screw 122 to each bearing bracket 76 has its upper end in contact with one of the metallic cylindrical portions 120 of the roller, one of these springs being provided for each of the two metallic portions. Set screws 123 extend through the focal plane support 78 and the bearing bracket 76, and have their ends in contact with the springs 121. Adjustment of each screw 123 obviously increases or decreases the force which its associated spring exerts against the portion 120 of the roller, and thus varies the friction or retarding effect produced by the spring upon the roller.

This variation in retarding effect is of importance, since sensitized sheet material of different weights, thicknesses, or grades is frequently used at different times in the same camera, and the variations in these characteristics of the sheet material require variations in the tension or retarding effect produced by the roller 75, in order to obtain the best results and to get the sheet material to lie smoothly and accurately in the focal plane.

An idler roller 125 preferably of felt or the like is used to hold the sheet material tightly against the roller 75 so that it will not slip relative to this roller. This idler roller 125 has each end journalled in one arm of a bell crank 126, one such bell crank being provided at each side of the magazine portion and being pivoted at 127 to the wall of the magazine portion. A spring 128 attached to the other arm of each bell crank tends to move the bell crank in a clockwise direction when viewed as in Fig. 6, so that the roller 125 is moved downwardly resiliently into contact with the other roller 75 or with the sheet material 78. Stop pins 129 limit the movement of the bell cranks when the roller 75 is withdrawn from cooperation with the roller 125 as described below. Since the two bell cranks 126 on which the roller 125 is mounted are movable independently of each other, each end of the roller 125 may move toward and away from the roller 75 independently of the other end, and thus a good contact may be obtained throughout the entire length of the roller.

With the use of the cooperating rollers 75 and 125 as described, and with retarding means in connection with one of these rollers, it is evident that when the feeding force applied to the sheet material by the rollers 80 and 81 is stopped, the forward movement of the sheet material will stop extremely quickly and the effect thereof will be negligible so far as that portion of the sheet material beyond the rollers 75 and 125 is concerned. Thus that portion of the sheet material between these two idler rollers and the feeding rolls 80 and 81 will remain substantially taut or under tension notwithstanding the sudden stoppage of the feed rolls, and this portion of the sheet material will accordingly lie smoothly and accurately in the focal plane of the camera. The inertia of the roll of sensitized material within the roll box 72 may cause some looseness of the sheet material in the box behind the rollers 75 and 125, but these rollers will prevent this looseness from affecting the portion of the sheet material which is in the focal plane.

When a heavy grade of sensitized sheet material is employed, such as card stock, for example, it is found that that portion of the sheet material adjacent the roller 75 is apt to bulge somewhat away from the surface of the focal plane support 73, on account of the sharp bend which the sheet material makes around the roller, notwithstanding the use of the retarding or tensioning mechanism above described. It is desirable, therefore, to exclude the portion of the sheet material adjacent the roller 75 from the field of exposure, and to confine the field of exposure to that portion of the sheet material which is a substantial distance away from the roller 75 and which accordingly lies smoothly and accurately in the focal plane.

This may be accomplished by using a masking member 135 (Figs. 6 and 7) pivoted at 136 to the top of the magazine portion and arranged to extend vertically downward from this pivot for a substantial distance below the roller 75, across the front of the sheet material. A rearward flange 137 at the bottom of this masking member 135 is cut away throughout the central portion of the masking member so that it will not contact with the sensitized material 78. At the sides of the masking member, however, this flange 137 is not cut away but is somewhat wider than the central cut away portion, so that it rests against the front of the pivoted focal plane support 73 and serves to force the latter back tightly against a suitable stop (not shown), thus maintaining this support in its normal operative position illustrated in Fig. 6. The masking member 135, in turn, is held in position by a pair of pivoted latches 138, one at each lower corner of the masking member, each latch being arranged to be forced behind a lug 139 as shown in Figs. 6 and 7, to hold the masking member tightly against the focal plane support 73.

When it is desired to remove the roll box 72 from the camera to replenish the supply of sensitized sheet material, the magazine portion of the camera is unlatched from the body portion and thrown back to the position shown in Fig. 3. This, of course, opens up the front of the magazine portion, which front then becomes the open top of this portion when it is turned through 90° to this position. The latches 138 may then be reached and disengaged from the lugs 139, after which the masking member 135 may be moved in a counter-clockwise direction when viewed as in Fig. 6 about its pivot 136. This moves it out of contact with the focal plane support 73 and permits this support to be moved in a clockwise direction about its pivot 74, the roller 75 carried by the focal plane support being moved bodily therewith. As the roller 75 moves out of cooperation with the roller 125, the springs 128 move the bell cranks 126 until they come into contact with stop pins 129, which limit the movement of these bell cranks.

When the masking member 135 and focal plane support 73 have thus been shifted, the roll box 72 is accessible and may be lifted out of the magazine portion of the camera. When the supply of sheet material is replenished, the roll box is replaced, the end of the sheet material 78 is carried over the roller 75, the focal plane support 73 is returned to its normal position at the focal plane of the camera, and the masking member 135 is moved to its normal position against the focal plane support and latched there by the latches 138 so that it holds the focal plane support in position.

It has been mentioned above that the web 78 of sheet material as it was fed downwardly by the feed rools 80 and 81 passes through the slot 105 in the bottom of the magazine portion of the camera, through a corresponding slot 160 in the partition 60 and into a print receiving receptacle. This receptacle is of the form best shown in Figs. 2, 11 and 12, and comprises a rectangular drawer 150 arranged to slide transversely of the apparatus on a surface 151 which has upstanding flanges 152 at the sides thereof to prevent lateral displacement of the drawer. When the drawer is in the position for receiving prints, the outer end thereof forms part of the side wall of the camera casing, while the inner end of the drawer is within the camera casing, of course, and adjacent the wall 155 at the opposite side thereof.

Figure 11:
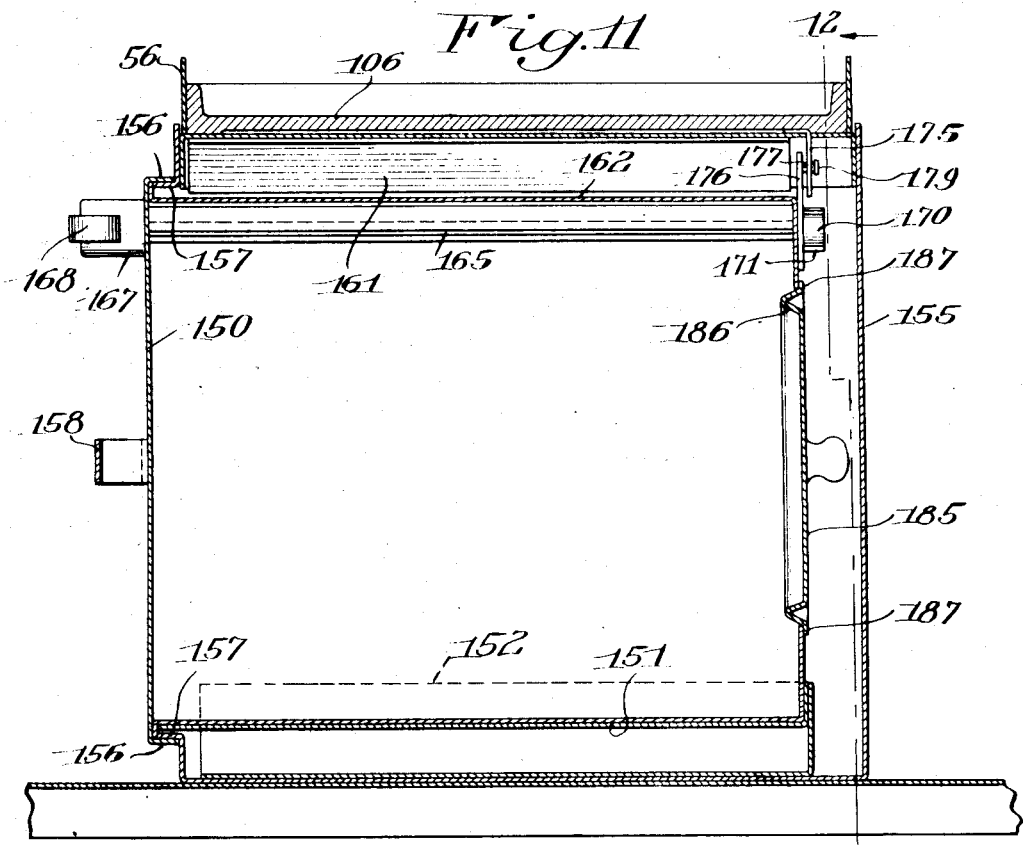
Fig. 11 is a transverse vertical section on the line 11—11 of Fig. 3, illustrating details of the interlock between the closure for the sensitized sheet receptacle and other parts of the apparatus.

In order to form a light tight connection between the drawer and the casing so that light may not enter the camera through the joints between the drawer and the camera wall, the front of the drawer is provided with an inturned flange 156 arranged to fit closely over an outwardly extending flange 157 on the camera body, as illustrated particularly in Fig. 11. The front of the drawer is provided with a handle 158 by means of which it may be pulled out of the camera.

Referring now to Figs. 2, 13 and 14, the slot 160 in the partition 60 has downwardly extending slightly converging flanges 161 at the edges thereof to form a short guiding chute. This slot 160 is formed in the partition 60 in such position that it will register with the slot 105 in the bottom of the magazine portion of the camera when this magazine portion is in its normal position for making exposures. The top 162 of the print receiving drawer 150 is provided with a slot 163 arranged to be directly below the chute 161 when the drawer is in its print receiving position. Downwardly extending flanges 164 are placed at each side of this slot 163.

It will now be apparent that as the exposed sheet material is fed downwardly by the feed rolls 80 and 81, it passes through the slot 105 in the magazine portion, through the slot 160 in the partition 60, through the slot 163 in the top of the print receiving drawer, and into this drawer. When the severing knife 107 is subsequently actuated, the severed portion of the sheet material falls by gravity to the bottom of the print receptacle. At any convenient later time, this print receptacle may be removed from the camera and taken to a dark room, and the prints may be removed from the receptacle in the dark room to be developed.

When the drawer 150 is removed from the camera, means must be provided for closing the slot 163 through which the prints enter the drawer, so that light will not enter through this slot to fog or damage the print. This closure means may comprise a shallow trough-shaped member 165 supported by ears 166 fixed to a shaft 167 pivoted in the ends of the drawer in such manner that light may not enter through the pivot bearings. The shaft 167 extends out through the front of the drawer and has a handle 168 by means of which the shaft may be turned.

Movement of the handle 168 to the position illustrated in Fig. 1 results in placing the trough-shaped member 165 in the position shown in Fig. 13, in which it does not interfere with free passage of prints into the receptacle. If the handle be moved in a counter-clockwise direction to the position shown in Fig. 3, this will rotate the shaft 167 to shift the trough-shaped member 165 to the position shown in Fig. 14, in which a soft pad 169 of felt or the like comes into contact with the bottom edges of the flanges 164 and thus seals the opening in the top of the drawer so that light will not enter therethrough when the drawer is removed from the camera.

The weight of the handle 158, being on the opposite side of the shaft 167 from the trough member 165, tends to keep this trough member closed when it is moved to closed position, or to keep it open when it has been moved to the open position, and resilient means is preferably also provided to assist in holding the trough member in either one of the positions to which it has been set. This resilient means may comprise a disk 170 (Fig. 12) fixed to the rear end of the shaft 167 and a spring 171 secured to the drawer in position to cooperate with the disk. Two flat spots are formed on the disk in such manner that the spring 171 presses against one of them when the closure is in open position and against the other one when the closure is in closed position, the spring thus offering resistance to turning of the shaft 167 and assisting in holding the closure in the position to which it is set.

Lest the operator of the apparatus forget to move the closure member to effective position before removing the print receptacle from the apparatus, locking mechanism is provided for preventing removal of the receptacle from the camera, and this locking mechanism is interconnected with the closure so that movement of the closure to effective position will unlock the locking mechanism and permit withdrawal of the print receptacle. Preferably, locking mechanism is also provided for preventing shifting of the magazine portion of the camera to the open position shown in Fig. 3, and this locking mechanism is likewise interconnected with the receptacle closure so that movement of the latter to effective position renders the locking mechanism inoperative and permits shifting of the magazine portion. It is apparent that opening the magazine portion without closing the opening in the print receptacle would be just as disastrous as withdrawal of the receptacle from the camera without closing the opening, since in either case light would enter the opening 163 and fog the prints within the receptacle.

The locking mechanism for preventing withdrawal of the print receptacle and that for preventing opening of the magazine portion of the camera may be separate and distinct from each other or both functions may be performed in part by the same mechanism. In the present instance, a downwardly extending lug 175 is fixed to the under side of the frame member 106 which constitutes the bottom of the magazine portion of the camera, as shown especially in Figs. 11 to 14. This lug 175 extends through a slot in the partition member 60, and down into the space below this partition member, the slot being sufficiently large so that the lug 175 may pass freely through it as the magazine portion is shifted back and forth from the normal position shown in Fig. 1 to the open position shown in Fig. 3.

Figure 12:
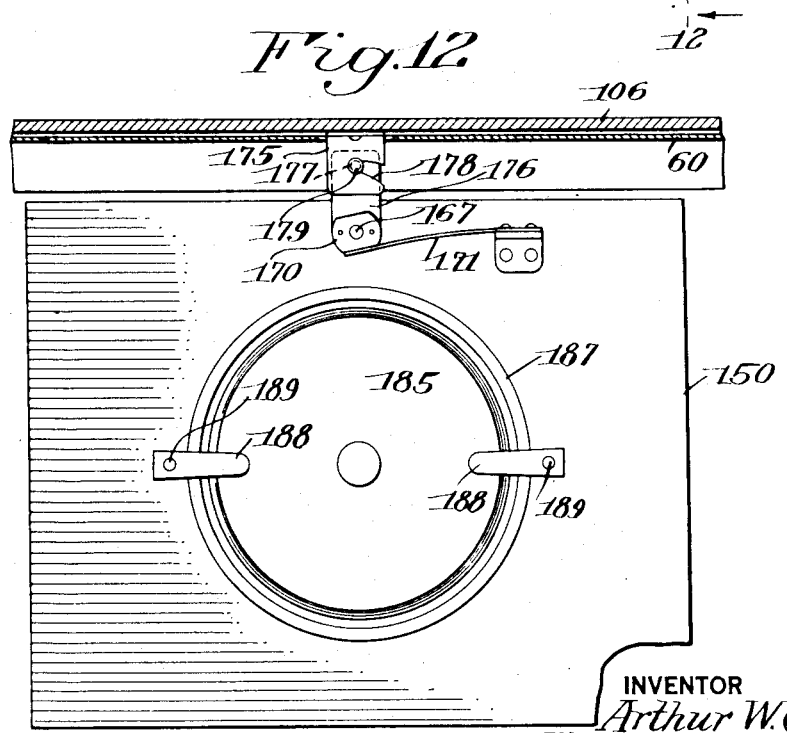
Fig. 12 is a vertical section taken substantially on the line 12—12 of Fig. 11, illustrating other details of this interlock.

A lug 176 is fixed to the shaft 167 near the rear end thereof, preferably next to the disk 170, and is arranged so that it extends upwardly as shown in Figs. 11, 12 and 13 when the closure member 165 is in open position and extends downwardly as shown in Fig. 14 when the closure member is in closed or effective position. This lug 176 carries a stud 177 arranged to enter a slot 178 in the lug 175, which stud has an enlarged head 179 to engage the rear side of the lug 175 to prevent longitudinal withdrawal of the pins from the slot.

When the closure member 165 is in its open or ineffective position illustrated in Figs. 11 to 13, it will be seen that the lug 176 on the shaft 167 extends upwardly and that the headed stud 177 thereon passes through the slot 178 in the lug 175. In this position of the parts, the magazine portion 56 of the camera cannot be opened, since opening thereof requires an upward movement of the lug 175, and such upward movement is prevented by engagement of the pin 177 in the slot 178 of the lug. Furthermore, the print receptacle may not be withdrawn from the camera, since the enlarged head 179 on the stud 177 would engage the rear side of the lug 175 and prevent such withdrawal.

If the handle 168 be shifted, however, to move the closure 165 to its closed or effective position illustrated in Fig. 14, the stud 177 is then no longer within the slot 178, but the lug 176 on the contrary, extends downwardly. The locking mechanism is then ineffective, and the print receptacle may be withdrawn from the camera or the magazine portion 56 may be opened at will. In either case, the closure being in effective position prevents entrance of light into the print receptacle and thus prevents the prints from becoming fogged.

When the print receptacle has been removed from the camera and taken to a dark room, the prints are removed and developed. It would be a comparatively difficult matter to remove the prints from the receptacle by way of the slot 163, since this slot is comparatively narrow. A relatively large opening is therefore preferably provided in the receptacle so that prints may be easily removed therefrom. In the present instance, this opening is so placed that it is inaccessible while the receptacle is in print receiving position within the camera and is accessible only when the receptacle is removed from the camera.

The construction of this removal opening is best illustrated in Figs. 11 and 12, from which it is seen that a circular opening is provided in the inner or rear end of the drawer, that is, the end opposite to that on which the handle 158 is placed. A closure 185 is provided for this opening, the closure having a circumferential V-shaped corrugation 186 the outer surface of which is tapered or conical so that it may be forced tightly into the opening and prevent entrance of light into the receptacle. A marginal flange 187 extending a slight distance beyond the edge of the corrugation lies in contact with the wall of the receptacle as shown in Fig. 11 and assists in making the closure light tight. The closure is held in position by spring clips 188 pivoted at 189 to the wall of the receptacle, so that they may be swung aside when the closure is to be opened or may be swung to the position shown in Fig. 12 to keep the closure tightly shut.

It will be observed from Fig. 11 that when the print receptacle is in print receiving position in the camera, the closure 185 is inaccessible, being behind the wall 155 of the camera casing. The closure 185 may be reached and opened only after the receptacle has been completely withdrawn from the camera. This minimizes the danger of leakage of light into the print receptacle. If the closure 185 is not perfectly light tight, this does no harm during the time that the print receptacle is within the camera, since during this time light cannot even reach the exterior of the closure. During the comparatively short time that the receptacle is being transported from the camera to the dark room, leakage of light through a slightly imperfect closure might be so small as to have a negligible effect upon the prints.

Figure 10:
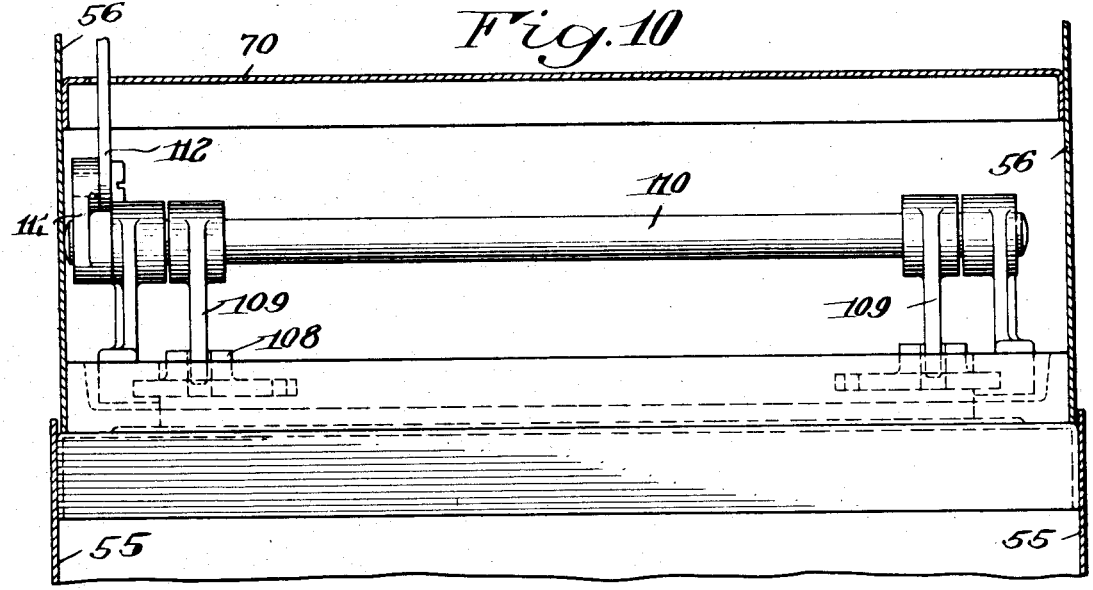
Fig. 10 is an end elevation of the sheet severing mechanism, with portions of the casing in section.

The joint between the magazine portion 56 and the body portion 55 of the camera is, of course, made light tight. Along the bottom of the magazine portion, the side walls of this portion overlap and fit within the side walls of the body portion 55, as shown in Fig. 10. Along the vertical joint at the front of the magazine portion, the body portion is provided with a double wall the two parts of which are slightly spaced, and the wall of the magazine portion extends between them and overlaps the edges thereof. At the joint at the top of the magazine portion, this portion is arranged to lie against a strip 195 of felt or the like held in position by a Z-bar 196, so that entrance of light at this point is effectually prevented.

In operation, the articles to be photographed are placed upon the transparent supporting surface 26 of the copyholder, which surface may be brought into proper focus by elevating or lowering it by means of the adjusting screws 24. It will be understood that the surface to be photographed is placed downwardly against the top of the supporting surface 26. If the article being photographed is a comparatively thin paper or document, the follower member 29 is brought down against the top of it and latched by the latch 39 so as to hold the document smooth and flat on the top of the transparent plate 26. This downward movement of the follower member depresses the plunger 46 and automatically closes the switch 45, lighting the lights 40 so that the object to be photographed is illuminated ready for the exposure.

If, on the contrary, the object to be photographed is bulky, such as a package or book, the follower member 29 may be thrown back to an ineffective position and the book or package may be placed on the plate 26 with the side to be photographed downward, being held there simply by gravity or by the use of weights. This arrangement is particularly useful in express offices or the like where it may be desired to photograph in rapid succession the address labels on a great number of packages. Each package need simply be placed on the copyholder with the address label in contact with the transparent plate 26. When the apparatus is used in this way, without employing the follower member 29, the lights 40 are turned on by the manual switch 50.

The object to be photographed now being properly placed on the copyholder and the lights being lit, an exposure is made by opening the shutter for the proper length of time by means of the handle 67. The prism 62 and the lens system of the camera throw the image of the object being photographed on to the expanse of sensitized sheet material which is stretched on the focal plane support 73.

The exposure being completed, the operator releases the latch 99 of the feeding handle 90 and gives this handle one complete revolution, the handle being stopped exactly at the end of one revolution by the latch. Rotation of the handle drives the feeding rolls 80 and 81 a sufficient extent to feed the exposed sheet material downwardly out of the focal plane and to draw a fresh unexposed area of sheet material into the focal plane. The handle 115 is then moved to operate the severing knife 107, which cuts the exposed print from the rest of the strip of sheet material and allows the print to drop into the drawer or print receiving receptacle 150.

Another object to be photographed is then placed on the copyholder and the process is repeated in the same way. When a number of prints have accumulated in the drawer 150, the handle 168 is turned to the position shown in Fig. 3, which closes the closure 165 and seals the print receptacle against entrance of light thereinto so that it may be removed from the camera and taken to a dark room without fear of fogging the prints within the receptacle. In the dark room, the closure 185 is removed from the receptacle, thus opening a comparatively large hole into the receptacle through which the exposed prints may easily be removed to be developed.

When the supply of sensitized sheet material within the camera is exhausted, the magazine portion 156 is opened or thrown back to the position shown in Fig. 3, thus permitting access to the interior of the magazine portion and allowing the supply of sensitized material to be replenished. Before the magazine portion is moved to this position, the handle 168 must be in the position shown in Fig. 3 in which the closure 165 is closed, because of the interconnection between this closure and the lock for holding the magazine portion in its normal or closed position. When the magazine portion is open the masking member 135 may be unlatched and shifted out of the way so that the focal plane support 73 may be turned about its pivot 74 to allow the roll box 72 to be withdrawn in order that a fresh roll of sensitized sheet material may be placed therein.

While one embodiment of the invention has been disclosed, it is to be understood that the inventive idea may be carried out in a number of ways. This application is, therefore, not to be limited to the precise details shown, but is intended to cover all variations and modifications thereof falling within the spirit of the invention or the scope of the appended claims.

I claim as my invention:

1. In a photographic apparatus, the combination with a camera, of a receptacle into which exposed prints from said camera are fed, said receptacle having an opening for passage of said prints, flanges adjacent the edges of said opening, and a trough-shaped member movable into cooperation with said flanges to seal said opening and to prevent passage of light therethrough into said receptacle.

2. In a photographic apparatus, the combination with a camera, of a receptacle into which exposed prints from said camera are fed, said receptacle having an opening for passage therethrough of said prints, flanges adjacent the edges of said opening, and closure means including a pad of resilient material arranged to be moved into contact with said flanges to seal said opening to prevent passage of light therethrough into said receptacle.

3. In a photographic apparatus, the combination with a camera, of a receptacle into which exposed prints from said camera are fed, said receptacle being movable relative to said camera and having an opening for passage therethrough of said prints, movable closure means for said opening, and mechanism associated with said closure means for holding said receptacle in predetermined relationship to said camera.

4. In a photographic apparatus, the combination with a camera, of a receptacle into which exposed prints from said camera are fed, said receptacle being movable relative to said camera and having an opening for passage therethrough of said prints, movable closure means for said opening, locking mechanism for maintaining said receptacle in predetermined relationship to said camera, and means for operating said closure means and said locking mechanism concomitantly.

5. In a photographic apparatus, the combination with a camera, of a receptacle into which exposed prints from said camera are fed, said receptacle being movable relative to said camera and having an opening for passage therethrough of said prints, movable closure means for said opening, locking mechanism for holding said receptacle in predetermined relationship to said camera, and means interconnecting said closure means with said locking mechanism to render said locking mechanism ineffective only when said closure means is effective, and to render said closure means ineffective only when said locking mechanism is effective.

6. In a photographic apparatus, the combination with a camera having a body portion and a magazine portion movable relative thereto, of a receptacle into which exposed prints from said camera are fed, said receptacle having an opening for passage therethrough of said prints, closure means for said opening, and mechanism associated with said closure means for holding said magazine portion in predetermined relationship to said body portion of the camera.

7. In a photographic apparatus, the combination with a camera having a body portion and a magazine portion movable relative thereto, of a receptacle into which exposed prints from said camera are fed, said receptacle having an opening for passage therethrough of said prints, closure means for said opening, locking mechanism for holding said magazine portion in predetermined relationship to said body portion, and means for operating said closure means and said locking mechanism concomitantly.

8. In a photographic apparatus, the combination with a camera having a body portion and a magazine portion movable relative thereto, of a receptacle into which exposed prints from said camera are fed, said receptacle having an opening for passage therethrough of said prints, closure means for said opening, locking mechanism for holding said magazine portion in predetermined relationship to said body portion of said camera, and means interconnecting said closure means and said locking mechanism so that said locking mechanism is ineffective only when said closure means is effective and so that said closure means is ineffective only when said locking mechanism is effective.

9. In a photographic apparatus, the combination with a camera including a body portion and a magazine portion movable relative thereto, of a receptacle into which exposed prints from said camera are fed, said receptacle being movable relative to said camera and having an opening for passage therethrough of said prints, closure means for said opening, and means under the control of said closure means for maintaining said receptacle in predetermined relationship to said camera and for maintaining said magazine portion in predetermined relationship to said body portion of said camera.

10. In a photographic apparatus, the combination with a camera including a body portion and a magazine portion movable relative thereto, of a receptacle into which exposed prints from said camera are fed, said receptacle being movable relative to said camera and having an opening for passage therethrough of said prints, closure means for said opening, locking mechanism for maintaining said receptacle in predetermined relationship to said camera and for maintaining said magazine portion in predetermined relationship to said body portion of the camera, and means for operating said closure means and said locking mechanism concomitantly.

11. In a photographic apparatus, the combination with a camera including a body portion, and a magazine portion movable relative thereto, of a receptacle into which exposed prints from said camera are fed, said receptacle being movable relative to said camera and having an opening for passage therethrough of said prints, closure means for said opening, locking mechanism for maintaining said receptacle in predetermined relationship to said camera and for maintaining said magazine portion in predetermined relationship to said body portion of said camera, and means interconnecting said closure means with said locking mechanism so that said locking mechanism is ineffective only when said closure means is effective, and so that said closure means is ineffective only when said locking mechanism is effective.

12. In a photographic apparatus, the combination with a camera, of a receptacle into which exposed prints from said camera are fed, said receptacle being movable relative to said camera to and from a position for receiving prints from the camera, said receptacle having an opening for passage therethrough of prints from the camera into the receptacle, and having a second opening for removal of prints from the receptacle, said second opening being inaccessible when said receptacle is in position to receive prints from the camera, and being accessible only when said receptacle is moved a substantial distance from said position.

13. In a photographic apparatus, the combination with a camera, means for holding a supply of sheet material, mechanism for stretching sheet material in the focal plane of the camera, and a guide roller for said sheet material between said supply and said focal plane, of means for varying the resistance to rotation of said guide roller.

14. In a photographic apparatus, the combination with a camera, means for holding a supply of sheet material, mechanism for stretching sheet material in the focal plane of the camera, and a guide roller for said sheet material between said supply and said focal plane, of means for adjusting the resistance to rotation of said guide roller, said adjusting means including a spring engageable with a portion of said roller and mechanism for varying the tension of said spring.

15. In a photographic apparatus, the combination with a camera, of means for holding a supply of sensitized sheet material, means for feeding successive portions of the sheet material into the focal plane of the camera to be exposed, a pair of rollers between which the sheet material passes on its way to the focal plane, and mechanism for retarding rotation of one of said rollers to tension the sheet material to cause it to lie smoothly in the focal plane.

16. In a photographic apparatus, the combination with a camera, of means for holding a supply of sensitized sheet material, means for feeding successive portions of the sheet material into the focal plane of the camera to be exposed, a pair of rollers between which said sheet material passes on its way to the focal plane, a pair of bell crank levers, each end of one of said rollers being journalled in an arm of one of said bell cranks, and resilient means acting on the other arms of the bell cranks to tend to move the roller carried by the bell cranks into contact with the other roller to tension the sheet material so that it will lie smoothly in the focal plane.

17. In a photographic apparatus, the combination with a camera, of means for holding a supply of sheet material, means for feeding successive portions of the sheet material into the focal plane of the camera to be exposed, a pair of rollers between which said sheet material passes on its way to the focal plane, mechanism for moving one of said rollers toward the other of said rollers to hold the sheet material firmly between them, and means for varying the resistance to rotation of one of said rollers so that sheet material of varying characteristics may be tensioned sufficiently to cause it to lie smoothly in the focal plane.

18. In a photographic apparatus, the combination with a camera, of means for holding a supply of sensitized sheet material, means for feeding successive portions of the sheet material into the focal plane of the camera to be exposed, guiding means over which said sheet material passes on its way to the focal plane, and a pivoted masking member for masking the sheet material in the focal plane for a substantial distance beyond said guiding means to prevent exposure thereof.

19. In a photographic apparatus, the combination with a camera, of means for holding a supply of sheet material, means for feeding successive portions of the sheet material into the focal plane of the camera, to be exposed, a movable focal plane support for supporting the sheet material in the focal plane, and a masking member to cooperate with said movable focal plane support to hold the latter in predetermined position and to mask a portion of the sheet material supported on said focal plane support to prevent exposure thereof.

20. In a photographic apparatus, the combination with a camera, of means for holding a supply of sheet material, means for feeding successive portions of the sheet material into the focal plane of the camera to be exposed, a pivotally mounted focal plane support for supporting the sheet material in the focal plane of the camera, a roller carried by said focal plane support and bodily movable therewith for guiding said sheet material, and a second roller arranged to cooperate with the roller on the focal plane support when the latter is in operative position in the focal plane, so that the sheet material is engaged between the two rollers.

21. In a photographic apparatus, the combination with a camera, of means for holding a supply of sensitized sheet material, means for feeding successive portions of the sheet material into the focal plane of the camera to be exposed, a roller, a movable focal plane support for supporting the sheet material in the focal plane of the camera, a second roller mounted on said focal plane support in position to cooperate with said first named roller when the focal plane support is in operative position, and a masking member for holding said focal plane support in said operative position and for masking a portion of the sheet material in the focal plane to prevent exposure thereof.

22. In a photographic apparatus, the combination with a camera having a body portion and a magazine portion movable relative thereto to provide an opening in the magazine portion, of a receptacle for sheet material movably mounted within said magazine portion, and a pivoted focal plane support between the operative position of said receptacle and the opening of said magazine portion for supporting sheet material in the focal plane of the camera when said magazine portion is in operative relationship with the body portion of the camera, said focal plane support being pivoted so that when said magazine portion is opened, said focal plane support may be swung aside to permit withdrawal or insertion of said receptacle through said opening.

23. In a photographic apparatus, the combination with a camera having a body portion and a magazine portion movable relative thereto to provide an opening in the magazine portion, of a receptacle for sheet material movably mounted within said magazine portion, a pivoted focal plane support between the operative position of said receptacle and the opening of said magazine portion for supporting sheet material in the focal plane of the camera when said magazine portion is in operative relationship with the body portion of the camera, said focal plane support being pivoted so that when said magazine portion is opened said focal plane support may be swung aside to permit windrawal or insertion of said receptacle through said opening, and guiding means on said focal plane support and movable bodily therewith for guiding the sheet material on its way from said receptacle to the focal plane.

ARTHUR W. CAPS.